(12) United States Patent
Ng et al.

(10) Patent No.: US 11,724,314 B2
(45) Date of Patent: Aug. 15, 2023

(54) LARGE AREA RECOATING FOR ADDITIVE MANUFACTURING

(71) Applicant: Applied Materials, Inc., Santa Clara, CA (US)

(72) Inventors: Hou T. Ng, Campbell, CA (US); Daihua Zhang, Los Altos, CA (US); Nag B. Patibandla, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 18 days.

(21) Appl. No.: 17/375,853

(22) Filed: Jul. 14, 2021

(65) Prior Publication Data
US 2022/0016708 A1    Jan. 20, 2022

Related U.S. Application Data

(60) Provisional application No. 63/052,383, filed on Jul. 15, 2020.

(51) Int. Cl.
| | |
|---|---|
| *B22F 10/28* | (2021.01) |
| *B22F 12/30* | (2021.01) |
| *B22F 12/53* | (2021.01) |
| *B22F 12/63* | (2021.01) |
| *B22F 12/67* | (2021.01) |

(Continued)

(52) U.S. Cl.
CPC ............ *B22F 10/28* (2021.01); *B22F 12/222* (2021.01); *B22F 12/224* (2021.01); *B22F 12/30* (2021.01); *B22F 12/53* (2021.01); *B22F 12/63* (2021.01); *B22F 12/67* (2021.01); *B22F 12/90* (2021.01); *B33Y 30/00* (2014.12); *B33Y 40/00* (2014.12); *B33Y 10/00* (2014.12); *B33Y 50/00* (2014.12)

(58) Field of Classification Search
CPC ........ B22F 10/28; B22F 12/53; B22F 12/222; B22F 12/67; B22F 12/90; B22F 12/30; B22F 12/63; B22F 12/224; B33Y 30/00; B33Y 40/00
See application file for complete search history.

(56) References Cited

U.S. PATENT DOCUMENTS

| | | |
|---|---|---|
| 10,569,364 B2 | 2/2020 | Shi et al. |
| 2005/0280185 A1 | 12/2005 | Russell et al. |

(Continued)

FOREIGN PATENT DOCUMENTS

| | | |
|---|---|---|
| EP | 1631439 | 8/2007 |
| EP | 3628422 | 4/2020 |

(Continued)

OTHER PUBLICATIONS

International Search Report and Written Opinion in International Appln. No. PCT/US2021/041597, dated Oct. 29, 2021, 10 pages.

*Primary Examiner* — Joseph S Del Sole
*Assistant Examiner* — John Robitaille
(74) *Attorney, Agent, or Firm* — Fish & Richardson P.C.

(57) ABSTRACT

Methods and systems for additive manufacturing can include a modular spreader unit including multiple spreaders that collectively span the width of a large build area. The spreaders can be arranged in offset rows so that spreaders in a second row cover gaps between spreaders in a first row. The spreaders can be secured with quick release mechanisms for rapid replacement and adjustment during service intervals.

9 Claims, 3 Drawing Sheets

(51) Int. Cl.
  *B22F 12/00* (2021.01)
  *B33Y 30/00* (2015.01)
  *B33Y 40/00* (2020.01)
  *B22F 12/90* (2021.01)
  *B33Y 50/00* (2015.01)
  *B33Y 10/00* (2015.01)

(56) References Cited

U.S. PATENT DOCUMENTS

| | | |
|---|---|---|
| 2011/0109016 A1 | 5/2011 | Fuwa et al. |
| 2013/0186514 A1 | 7/2013 | Zhuang |
| 2014/0377117 A1 | 12/2014 | Herrmann et al. |
| 2015/0174824 A1 | 6/2015 | Gifford et al. |
| 2017/0021456 A1 | 1/2017 | Varetti |
| 2017/0036404 A1 | 2/2017 | Rengers et al. |
| 2017/0072643 A1 | 3/2017 | Ng et al. |
| 2018/0010237 A1 | 1/2018 | Forseth et al. |
| 2018/0169894 A1 | 6/2018 | Höchsmann et al. |
| 2018/0194074 A1* | 7/2018 | Shi .................. B23K 26/342 |
| 2018/0348367 A1 | 12/2018 | Crear et al. |

FOREIGN PATENT DOCUMENTS

| | | |
|---|---|---|
| JP | 2010-137482 | 6/2010 |
| WO | WO 2015/038072 | 3/2015 |
| WO | WO 2017/048919 | 3/2017 |

\* cited by examiner

LARGE AREA RECOATING FOR ADDITIVE MANUFACTURING

CROSS-REFERENCE TO RELATED APPLICATIONS

This application claims priority to U.S. Application Ser. No. 63/052,383, filed on Jul. 15, 2020, the disclosure of which is incorporated by reference.

TECHNICAL FIELD

This disclosure relates to methods and systems for recoating a large build area in additive manufacturing, also known as 3D printing.

BACKGROUND

Additive manufacturing (AM), also known as solid freeform fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic, composite, or metal).

A variety of additive processes can be used in additive manufacturing. Some methods melt or soften material to produce layers, e.g., selective laser melting (SLM) or direct metal laser sintering (DMLS), selective laser sintering (SLS), or fused deposition modeling (FDM), while others cure liquid materials using different technologies, e.g., stereolithography (SLA). These processes can differ in the way layers are formed to create the finished objects and in the materials that are compatible for use in the processes.

In some forms of additive manufacturing, a powder is placed on a platform and a laser beam traces a pattern onto the powder to fuse the powder together to form a shape. Once the shape is formed, the platform is lowered and a new layer of powder is added in a recoating process. In a typical recoating process, a new layer of powder is delivered over the build area by being pushed from a reservoir adjacent the build area by a spreader, such as a roller or blade. The fusing and the recoating are repeated until a part is fully formed.

SUMMARY

This specification describes methods and systems for recoating a large build area in additive manufacturing or 3D printing, e.g., using a modular spreader unit with ganged segmented rollers and/or blades that span a width of the build area. The modular recoater unit is translatable along a length of the build area using a translation mechanism such as a gantry system. The modular recoater unit can include at least two rows of ganged rollers and/or blades, where a first row of rollers/blades is offset from a second row of rollers/blades so that seams or gaps between adjacent rollers/blades in the first row do not coincide with seams or gaps between adjacent rollers/blades in the second row.

In general, a first aspect of the subject matter described in this specification can be embodied in additive manufacturing apparatuses that include:
a platform for receiving successive layers of feed material;
a dispenser assembly to deliver the feed material onto the platform; and a modular spreader unit to spread feed material delivered by the dispenser assembly and onto the platform into a layer, the modular spreader unit spanning a width of the platform in a first direction and configured to translate across the platform in a second direction, the modular spreader unit including a frame and a plurality of spreaders, each spreader independently detachable from the frame, the plurality of spreaders including a plurality of first spreaders arranged in a first row parallel to the first direction, and one or more second spreaders arranged in a second row parallel to the first direction so as to cover gaps between adjacent spreaders in the first row of first spreaders.

In some approaches, the first and second spreaders are first and second rollers. In some approaches, the first and second spreaders are first and second blades. In some approaches, the first spreaders are blades and the second spreaders are rollers.

In some approaches, the dispenser assembly spans the width of the platform in the first direction and is configured to translate across the platform in the second direction. The dispenser assembly can include multiple openings to deliver the feed material onto the platform, with the plurality of first spreaders positioned laterally along the second direction after a last of the openings. The dispenser assembly can be secured to the modular spreader unit and movable as a single unit with the modular spreader unit, or the dispenser assembly can be independently movable relative to the modular spreader unit.

In some approaches, each spreader is independently detachable from the frame via a quick release mechanism.

A second aspect of the subject matter described in this specification can be embodied in additive manufacturing systems that include: a ganged assembly of spreaders for iteratively recoating a build area with feed material iteratively delivered by a feed dispenser; where the ganged assembly includes a first row of spreaders and a second row of spreaders offset from the first row of spreaders so that gaps between adjacent spreaders in the first row of spreaders do not coincide with gaps between adjacent spreaders in the second row of spreaders. The spreaders in the ganged assembly of spreaders can include blades, rollers, or a combination of blades and rollers.

In some approaches, the system can further include: an environmentally sealed first chamber enclosing the build area; and a second chamber separated from the first chamber by a valve; where the ganged assembly of spreaders is moveable through the valve between the first chamber and the second chamber. The second chamber can include a calibration plate coplanar to the build area for alignment of each spreader.

In some approaches, the ganged assembly of spreaders can include a quick release mechanism for each spreader.

In some approaches, the ganged assembly of spreaders can include an alignment mechanism for each spreader. The system can further include one or more sensors for detecting misalignments of each spreader relative to the calibration plate. The one or more sensors can be selected from optical sensors, electrical sensors, and tunneling sensors.

A third aspect of the subject matter described in this specification can be embodied in methods of operating an additive manufacturing system, where the methods include: depositing a layer of feed material on a platform; first spreading the layer with a first set of rollers or blades on a spreader assembly spanning the platform, where the first spreading leaves a set of ridges corresponding to gaps between adjacent rollers or blades in the first set of rollers or blades; and second spreading the layer with a second set of rollers or blades on the spreader assembly spanning the platform, wherein the second spreading removes the ridges corresponding to the gaps between adjacent spreaders in the first set of rollers or blades.

In some approaches, the method further includes cyclically repeating an ordered sequence of the depositing, the first spreading, and the second spreading.

In some approaches, the system includes a build chamber and a service chamber separated by a seal, and the method further includes: moving the spreader assembly through the seal from the build chamber to the service chamber; removing a worn roller or blade and replacing it with a new roller or blade via a quick release mechanism; and adjusting height and skew of the new roller or blade relative to the platform via an alignment mechanism.

Particular implementations of the subject matter described in this disclosure can be implemented so as to realize, but are not limited to, one or more of the following advantages.

Using a modular system of spreaders such as rollers and/or blades provides the advantage of using shorter spreaders to span a larger build bed area. Shorter spreaders can be easier to manufacture within a desired tolerance, compared to a single longer spreader that spans the entire build bed area.

With a modular system of spreaders, individual spreaders can be replaced as needed, e.g., after a specific service interval or after a spreader has exhibited wear that degrades spreader performance. With a longer spreader that spans the entire build bed area, intolerable damage or wear at any region along the length of the longer spreader leads to costly replacement of the entire spreader, even if the spreader is otherwise undamaged or unworn outside of that wear or damage region. On the other hand, with a ganged modular system of shorter spreaders, spreaders need only be replaced where they are worn or damaged. Thus, for example, non-uniform wear across the span of the build area can be accommodated by more frequent replacement of spreaders in higher-wear locations along the span of the build bed area, and less frequent replacement of spreaders in lower-wear locations along the span of the build bed area. The modular system of spreaders can be implemented with quick release mechanisms to provide for rapid replacement/servicing and alignment of the individual spreaders.

A further advantage of a modular approach is scalability to differently sized build bed areas. If a single longer spreader must span the entire build bed area, a new spreader of custom length must be designed and machined for each implementation having a different build bed area width. On the other hand, with a modular system of spreaders, the same spreaders can be used to collectively span build beds of different widths, e.g., by using a different number of individual shorter spreaders in the modular unit, or by changing the spacing between individual shorter spreaders in the modular unit.

The details of one or more implementations are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Additive manufacturing with large build bed areas is desirable, e.g., to manufacture very large 3D printed parts such as engine casings, jet engine parts, or aerospace fuel nozzles. However, high-precision recoating during the build process may be necessary to manufacture a high quality 3D printed part, and high-precision recoating is increasingly difficult as the size of the build bed area increases. Recoating defects such as streaks, thickness non-uniformity, and high surface roughness can negatively impact the print yield and quality of final 3D printed parts.

A possible approach to recoating is to dispense the feed material on the build bed area, and then spread the dispensed feed material into a smooth and uniform layer using a spreader such as a roller or blade. However, if the build bed area is very large, the roller or blade is correspondingly large and can be prohibitively expensive to manufacture, especially for build bed areas larger than about half a meter in width.

The present specification presents a solution to this technical problem by describing modular systems of smaller spreaders that collectively span a larger build bed area. The smaller spreaders are easier to manufacture than a single larger spreader, and can be equipped with quick release and alignment mechanisms to provide for rapid replacement/servicing and alignment of the individual spreaders. Because multiple smaller spreaders are used to span the width of the build bed area, there will be gaps between adjacent spreaders; to cover these gaps and provide a uniform recoating layer across the entire width of the build bed area, the spreaders can be arranged in at least two rows, with spreaders in the second row laterally offset from spreaders in the first row to cover gaps between adjacent spreaders in the first row.

Figure 1:
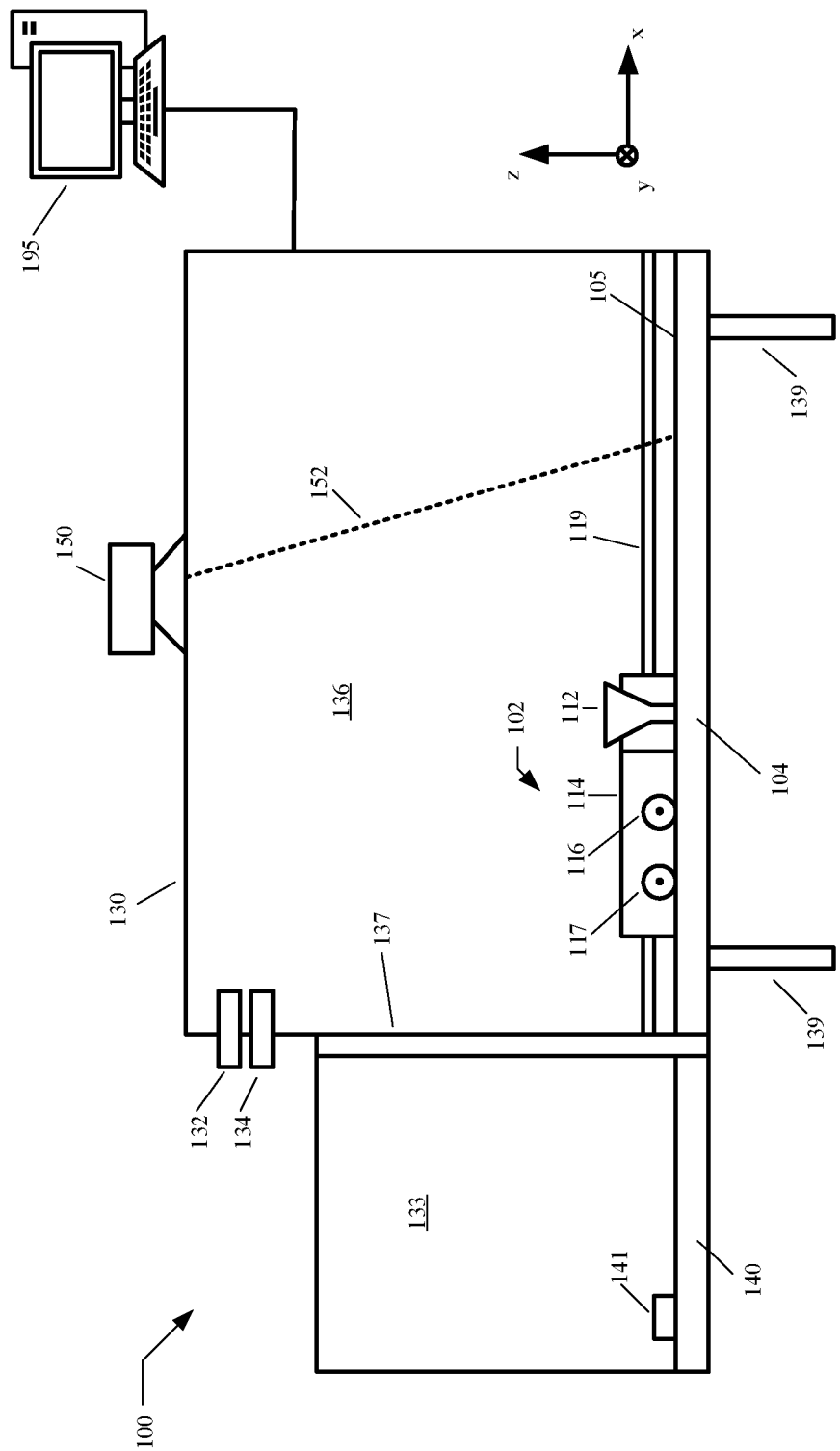
FIG. 1 depicts an example of an additive manufacturing system that includes a modular spreader unit.

FIG. 1 illustrates a schematic side view of an example additive manufacturing (AM) apparatus 100 that includes a printhead 102 and a build platform 104 (e.g., a build stage). The printhead 102 dispenses and spreads layers of one or more powders on a top surface 105 of the platform 104. By repeatedly dispensing and fusing layers of powder, the apparatus 100 can form a part on the build platform 104.

The printhead 102 and the build platform 104 can both be enclosed in a housing 130 that forms a sealed central chamber 136 that provides a controlled operating environment, e.g., a vacuum chamber. For example, the central chamber 136 can be vacuumed out to bring down the oxygen concentration to less than 1% of the air. In addition, an inert gas can be directed into the chamber 136 to maintain a low level of contaminants and unnecessary gas concentrations.

The housing 130 can include a printhead service and storage chamber 133 adjacent to the central chamber 136. The central chamber 136 can include an inlet 132 coupled to a gas source and an outlet 134 coupled to an exhaust system, e.g., a pump. The gas source can provide an inert gas, e.g. Ar, or a gas that is non-reactive at the temperatures reached by the powder for melting or sintering, e.g., $N_2$. This permits the pressure and oxygen content of the interior of the housing 130 to be controlled. For example, oxygen gas can be maintained at a partial pressure below 0.01 atmospheres.

The central chamber 136 may be maintained at atmospheric pressure (but at less than 1% oxygen) to avoid the cost and complexity of building a fully vacuum compatible system. Oxygen content can be below 50 ppm when the pressure is at 1 atmosphere, e.g., when dealing with Titanium (Ti) powder particles. Because metal powder can be highly reactive (particularly Ti) due to its high surface-area-to-volume ratio, oxygen concentration at less than 1% or less than 50 ppm helps avoid the spontaneous burning of metal powder upon excitation by the laser-beam. Thus, it is imperative to maintain low oxygen concentration and an inert gas environment to reduce the possibility of burning of metal powders.

The platform 104 can move downward as the additive manufacturing process progresses. For example, the build platform 104 can move downward by the thickness of one layer after each layer is deposited and fused. The build platform 104 can be vertically movable on a track 139, e.g., a rail.

The printhead 102 can be retracted into the printhead service and storage chamber 133, which can be sealed off by a slit valve 137. In some implementations, to remove the printed part from the platform 104, the platform 104 can be lowered and slid out, with the part still on the platform 104.

The printhead 102 can be configured to traverse the platform 104 laterally (i.e. in the x-direction as shown by the coordinate unit vectors). The apparatus 100 can include a support, e.g., a linear rail or pair of linear rails 119, along which the printhead 102 can be moved by a linear actuator and/or motor (not shown). This permits the printhead 102 to move across the platform 104 along a first horizontal axis (i.e., the x axis in the figure).

The platform 104 is movable along a vertical axis (the z axis) while the printhead 102 is movable along a horizontal axis (the x axis). In particular, after each layer of material is fused to form a portion of a 3D printed part, the platform 104 is lowered by an amount equal to the thickness of the deposited layer of powder. This can maintain a constant height difference between the dispenser on the printhead 102 and the top of the powder on the platform 104. A drive mechanism, e.g., a piston or linear actuator, can be connected to the platform 104 or support holding the platform to control the height of the platform.

The printhead 102 can include a dispenser assembly 112 to selectively dispense a layer of a powder on the build platform 104, e.g., directly on the build platform 104 or on a previously deposited layer. In some implementations, the dispenser assembly 112 includes a plurality of independently controllable apertures, so that the powder can be controllably delivered along a line perpendicular to the direction of travel x (i.e. along the y direction in FIG. 1). Alternatively or additionally, the dispenser assembly can include multiple apertures along the direction of travel x.

The printhead 102 can also include a modular spreader unit 114 that includes at least a first row of spreaders 116 (e.g., rollers or blades) and a second row of spreaders 117 (e.g., rollers or blades) that cooperate with the dispensing system 112 to compact and spread powder dispensed by the dispenser assembly 112. Note that the first and second rows of spreaders 116, 117 are schematically depicted in FIG. 1 as single rollers viewed on end, because the rows of spreaders are arranged to laterally span a width of the build area 105, i.e. they are arranged along the y axis in the figure.

While the example of FIG. 1 shows a single moveable printhead 102 having the dispenser assembly 112 fixedly attached to the modular spreader unit 114, in other approaches, the dispenser assembly and the modular spreader unit are independently moveable within the build chamber 136. For example, the modular spreader unit 114 can be moved along the x-direction by an independently operable linear actuator and/or motor.

The apparatus 100 also includes at least one energy delivery system 150 that can generate at least one light beam 152 that is directed toward the uppermost layer of powder on the platform 104 and that can be used at least for fusing of the layer of powder on the platform 104. The light beam 152 and/or another light beam can be used for pre-heating and/or heat-treating the layer of powder. The energy delivery system 150 includes at least one light source to generate at least one light beam 152 and at least one reflector assembly to scan the light beam 152 on the layer of powder.

Figure 2A:
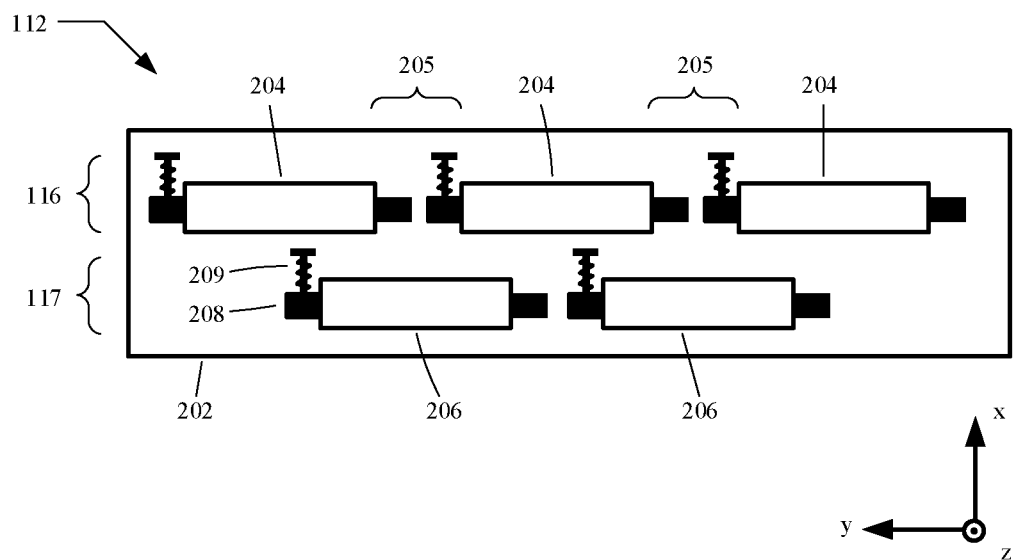
FIGS. 2A and 2B depict top and side views of a modular spreader unit.
Figure 2B:
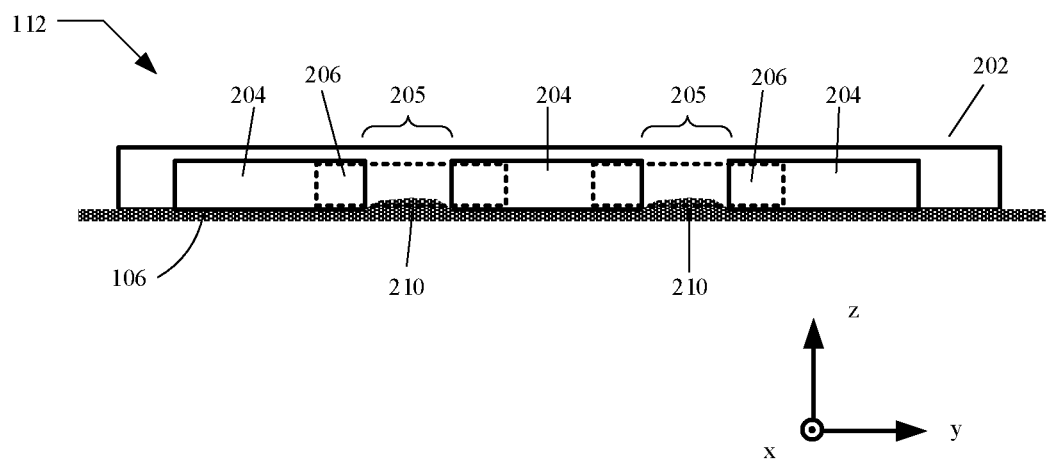

FIGS. 2A and 2B depict top and front views, respectively, of a modular spreader unit 114 such as that shown in FIG. 1. The axes indicate relative orientations of the depicted views relative to the system 100 of FIG. 1. The modular spreader unit includes a frame 202 supporting a first row 116 of spreaders 204 and a second row 117 of spreaders 206. The spreaders 204 and 206 can be rollers, blades, or any combination thereof; for example, the spreaders can be all rollers, or all blades, or one row of spreaders and one row of blades. The choice of whether to use rollers or blades may depend upon the flowability of the powder that is employed for the 3D printing process. For example, in cases where the flowability of the powder is low, the modular spreader unit may use rollers for both rows. In cases where the flowability of the powder is acceptably high, the modular spreader unit may use blades for both rows. In cases where the powder is acceptably flowable but layer compaction is required, the modular spreader unit may be use blades for the first row and rollers for the second row.

The spreaders are arranged in rows along the width of the build area (i.e. along the y direction in the figures) so that the modular spreader unit can span the entire width of the build area. For example, the first row can include two or more spreaders 204 extending along the y axis to spend the width of the build area. The second row can include one or more spreaders that are arranged to cover gaps 205 between adjacent spreaders in the first row. For example, if the first row includes three spreaders 204 (as shown), the second row can include two spreaders 206 (as shown) that cover the two gaps 205 between adjacent gaps in the first row of spreaders. If the first row only includes two spreaders 204, there is only one gap 205 and the second row may only include one spreader covering that gap.

As seen in FIG. 2B, a new layer of powder 106 that has been smoothed out and/or compacted by the spreaders 204 in the first row may include ridges or seams 210 in the powder coinciding with gaps 205 between the spreaders 204. These ridges or seams can be smoothed out and/or compacted by the spreaders 206 in the second row (shown as dashed lines in FIG. 2B because they are behind the spreaders 204 as viewed from the front).

The modular spreader unit can include release mechanisms 208 and/or alignment mechanisms 209 for ease of replacement and alignment of the individual spreaders 204, 206 during servicing of the modular spreader unit. Each release mechanism 208 can be a quick release mechanism, e.g., a mechanism that is manually operable without requiring specialized tools in less than a minute. An example of a quick release mechanism is a lever-operated cam where, by opening or closing a cam lever, an individual spreader can be attached or detached from the frame. In some approaches a lever-operated cam can be mounted to the frame 202 so that the lever action of each cam causes a body having a recess or projection translating laterally into or out of a mating position with a corresponding projection from or recess in a side of each spreader. A quick release mechanism 208 may be positioned at both ends of each spreader, as shown in FIG. 2A, or at just one end of each spreader. Where a quick release mechanism 208 is positioned at one end of the spreader, the other end can be held by a pin and receiving recess configuration. The pin can project from the spreader and the recess can project from the frame, or vice versa.

Adjustment mechanisms 209 can include, for example, precision adjustment screws that can be adjusted to modify a height and/or skew of each roller. Adjustment mechanisms 209 can be positioned at just one end of each spreader, as shown in FIG. 2A, or adjustment mechanisms can be provided at both ends of each spreader.

Referring back to FIG. 1, for purposes of alignment of individual spreaders after replacement, the service chamber 133 can include a calibration plate 140 having a top surface that is parallel to the top surface of the build platform 104. The top surface of the calibration plate can be coplanar with the top surface of the build platform 104 when the build platform is vertically positioned for receipt of a first layer of powder.

When a spreader is replaced, the adjustment mechanism can be manipulated to make the new spreader flush with the calibration plate. For further precision, the service chamber may include one or more sensors 141 for detecting the alignments of the individual spreaders. These sensors can include, for example, optical sensors, electrical contact sensors, or pressure sensors such as tunneling sensors. In particular, the support 114 can be moved so that the spreaders 116, 117 are contacting or immediately adjacent the calibration plate 140. Then the alignment mechanisms 209 can be adjusted so that the bottom of each spreader is parallel to the top surface of the calibration plate, and the bottom of each spreader is coplanar.

Figure 3:
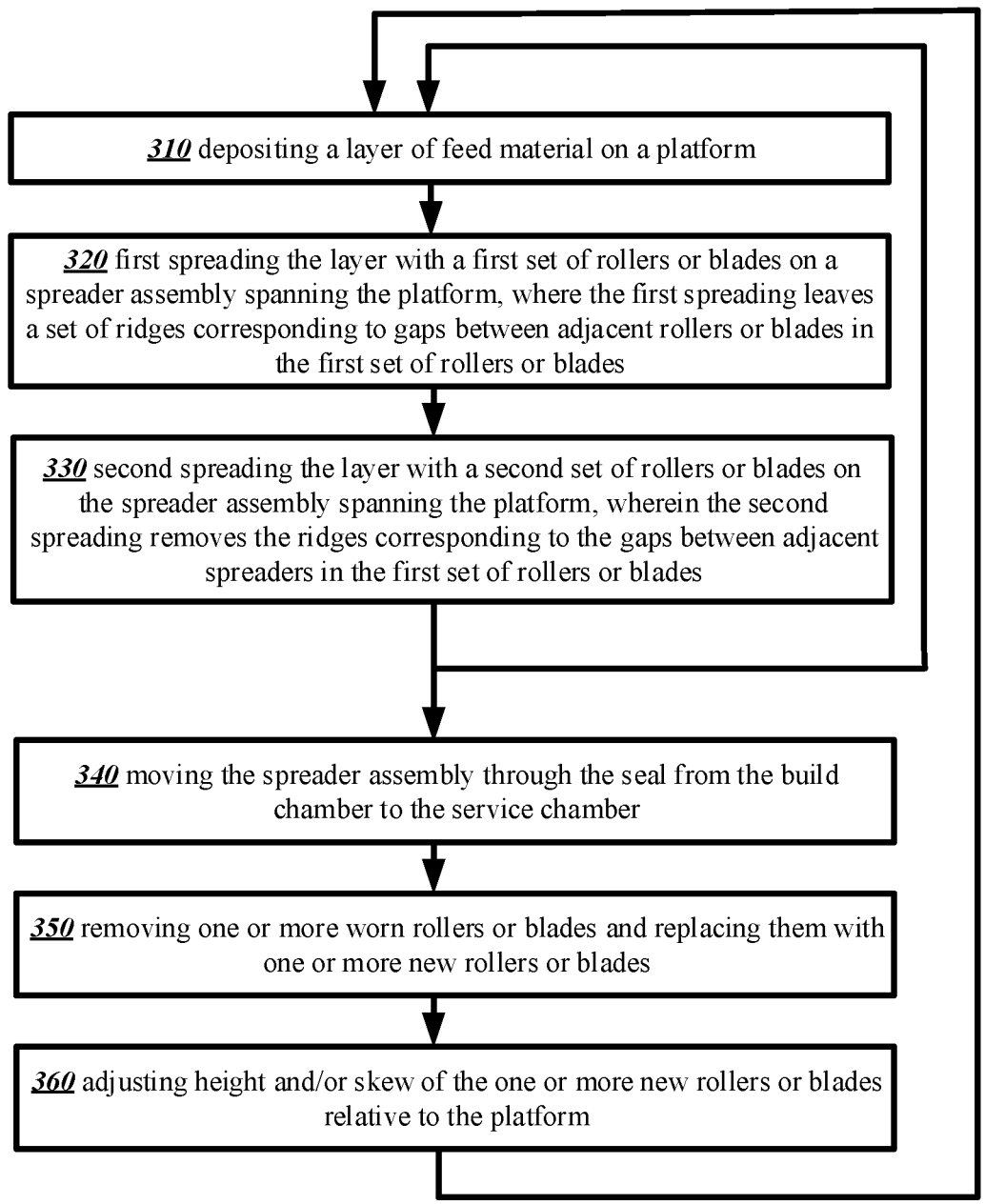
FIG. 3 depicts a flow diagram for a method of recoating with a modular spreader unit.

With reference now to FIG. 3, an illustrative example is depicted as a process flow diagram for a method of recoating a large build area with a modular spreader unit. The process includes depositing a layer of feed material on a platform (310). For example, the dispenser assembly 112 of FIG. 1 can dispense powder on the build area 105. The layer is spread with a first set of rollers or blades on a spreader assembly spanning the platform, where the first spreading leaves a set of ridges corresponding to gaps between adjacent rollers or blades in the first set of rollers or blade (320). For example, as seen in FIGS. 2A and 2B, a first row 116 of spreaders 204 can smooth and/or compact the powder that has been dispensed onto the build area by the dispenser assembly, leaving ridges or seams 210 in the powder coinciding with gaps 205 between adjacent spreaders 204 in the first row 116 of spreaders. The layer is then spread with a second set of rollers or blades on the spreader assembly spanning the platform, wherein the second spreading removes the ridges corresponding to the gaps between adjacent spreaders in the first set of rollers or blades (330). For example, as seen in FIGS. 2A and 2B, a second row 117 of spreaders 206 can cover the gaps 205 to smooth and/or compact the ridges or seams 210 left behind after the spreading by the first row 116. As shown in FIGS. 3, 310, 320, and 330 can be cyclically repeated as the 3D printed object is built up layer-by-layer in the build chamber.

The process of FIG. 3 can include a service interval for replacement of spreaders that have become worn or damaged. This includes moving the spreader assembly through the seal from the build chamber to the service chamber (340). For example, the printhead 102 in FIG. 1 can be moved from the build chamber 136 through the seal 137 to the service chamber 133. Then one or more worn rollers or blades are removed and replaced with one or more new rollers or blades (350). For example, individual spreaders 204, 206 in need of replacement can be removed and replaced via the quick release/alignment mechanisms 209 of FIG. 2B. Then the height and/or skew of the one or more new rollers or blades are adjusted relative to the platform (360). For example, the mechanisms 209 shown in FIG. 2B can be adjusted to make the new spreaders flush with the calibration plate 140 of FIG. 1, and/or the mechanisms 209 can be adjusted until alignment sensors 141 indicate that the newly installed spreader is trued and ready to go into service for recoating. As shown in FIG. 3, after the completion of this service interval 340, 350, 360, the system can return to the layer-by-layer recoating process of 310, 320, and 330.

Referring back to FIG. 1, the apparatus 100 includes a controller 195 coupled to the various components of the apparatus, e.g., power sources for the light sources, actuators and/or motors for beam scanners, and actuators and/or motors for the printhead 102 (including actuators and/or motors for the dispenser assembly 112 and for the modular spreader unit 114), to cause the apparatus to perform the necessary operations to fabricate an object.

The controller 195 can include a computer aided design (CAD) system that receives and/or generates CAD data. The CAD data is indicative of the object to be formed, and, as described herein, can be used to determine properties of the structures formed during additive manufacturing processes. Based on the CAD data, the controller 195 can generate instructions usable by each of the systems operable with the controller 195, for example, to dispense and spread powder, to fuse the powder, to move various systems of the apparatus 100, and to sense properties of the systems, powder, and/or the object.

The controller 195, for example, can transmit control signals to drive mechanisms that move various components of the apparatus. In some implementations, the drive mechanisms can cause translation and/or rotation of these different systems. Each of the drive mechanisms can include one or more actuators, linkages, and other mechanical or electromechanical parts to enable movement of the components of the apparatus.

The controller and other computing devices that are part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

A number of implementations have been described. Other embodiments are within the scope of the following claims.

What is claimed is:

1. An additive manufacturing apparatus comprising:
a platform for receiving successive layers of feed material;
a dispenser assembly to deliver the feed material onto the platform; and
a modular spreader unit to spread feed material delivered by the dispenser assembly and onto the platform into a layer, the modular spreader unit spanning a width of the platform in a first direction and configured to translate across the platform in a second direction, the modular spreader unit including a frame and a plurality of spreaders, each spreader independently detachable from the frame, the plurality of spreaders including
a plurality of first spreaders arranged in a first row parallel to the first direction, and
one or more second spreaders arranged in a second row parallel to the first direction so as to cover gaps between adjacent spreaders in the first row of first spreaders.

2. The apparatus of claim 1, wherein the first and second spreaders are first and second rollers.

3. The apparatus of claim 1, wherein the first and second spreaders are first and second blades.

4. The apparatus of claim 1, wherein the first spreaders are blades and the second spreaders are rollers.

5. The apparatus of claim 1, wherein the dispenser assembly spans the width of the platform in the first direction and is configured to translate across the platform in the second direction.

6. The apparatus of claim 5, wherein the dispenser assembly includes multiple openings to deliver the feed material onto the platform, and the plurality of first spreaders are positioned laterally along the second direction after a last of the openings.

7. The apparatus of claim 5, wherein the dispenser assembly is secured to the modular spreader unit and movable as a single unit with the modular spreader unit.

8. The apparatus of claim 5, wherein the dispenser assembly is independently movable relative to the modular spreader unit.

9. The apparatus of claim 1, wherein each spreader is independently detachable from the frame via a cam lever quick release mechanism.

* * * * *